United States Patent
Das Sharma et al.

(10) Patent No.: US 12,455,827 B2
(45) Date of Patent: Oct. 28, 2025

(54) SYSTEM, APPARATUS AND METHODS FOR PERFORMING SHARED MEMORY OPERATIONS

(71) Applicant: Intel Corporation, Santa Clara, CA (US)

(72) Inventors: Debendra Das Sharma, Saratoga, CA (US); Robert Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 17/645,481

(22) Filed: Dec. 22, 2021

(65) Prior Publication Data

US 2022/0114098 A1    Apr. 14, 2022

(51) Int. Cl.
   *G06F 12/084*    (2016.01)
   *G06F 12/0815*   (2016.01)
   (Continued)

(52) U.S. Cl.
   CPC ........ *G06F 12/084* (2013.01); *G06F 12/0815* (2013.01); *G06F 13/1668* (2013.01); *G06F 13/4027* (2013.01); *G06F 2212/1016* (2013.01)

(58) Field of Classification Search
   CPC .. G06F 9/526; G06F 12/0815; G06F 12/0817; G06F 12/084; G06F 12/0857; G06F 12/109; G06F 13/1668; G06F 13/4207; G06F 15/167; G06F 2209/521; G06F 2212/1016; G06F 2212/1024; G06F 2212/657
   See application file for complete search history.

(56) References Cited

U.S. PATENT DOCUMENTS 9,164,911 B2    10/2015  Farrell et al.
11,604,737 B1*   3/2023  Greathouse ......... G06F 12/0831
                   (Continued)

FOREIGN PATENT DOCUMENTS

EP        3588317        1/2020

OTHER PUBLICATIONS

Patent Cooperation Treaty, International Search Report and Written Opinion mailed Jan. 5, 2022 in PCT Application No. PCT/US2021/050772 (12 pages).

(Continued)

*Primary Examiner* — Aracelis Ruiz
(74) *Attorney, Agent, or Firm* — Eversheds Sutherland (US) LLP

(57) ABSTRACT

In an embodiment, an apparatus for memory access may include: a memory comprising at least one atomic memory region, and a control circuit coupled to the memory. The control circuit may be to: for each submission queue of a plurality of submission queues, identify an atomic memory location specified in a first entry of the submission queue, wherein each submission queue is to store access requests from a different requester; determine whether the atomic memory location includes existing requester information; and in response to a determination that the atomic memory location does not include existing requester information, perform an atomic operation for the atomic memory location based at least in part on the first entry of the submission queue. Other embodiments are described and claimed.

20 Claims, 10 Drawing Sheets

(51) Int. Cl.
*G06F 13/16* (2006.01)
*G06F 13/40* (2006.01)

(56) References Cited

U.S. PATENT DOCUMENTS

| | | |
|---|---|---|
| 2017/0097867 A1 | 4/2017 | Glaser et al. |
| 2018/0011792 A1 | 1/2018 | Koker |
| 2019/0324928 A1* | 10/2019 | Brewer .............. G06F 12/0875 |
| 2020/0186414 A1 | 6/2020 | Sharma |
| 2020/0293480 A1 | 9/2020 | Iyer et al. |
| 2020/0394150 A1 | 12/2020 | Lanka et al. |
| 2021/0011864 A1 | 1/2021 | Guim Bernat et al. |
| 2021/0112132 A1 | 4/2021 | Paliwal et al. |
| 2021/0149600 A1 | 5/2021 | Brewer |
| 2021/0200545 A1 | 7/2021 | Marolia et al. |
| 2021/0232520 A1 | 7/2021 | Choudhary et al. |
| 2021/0349512 A1 | 11/2021 | Bernat et al. |
| 2022/0114098 A1 | 4/2022 | Das Sharma et al. |

OTHER PUBLICATIONS

Intel Corporation, Logical PHY Interface (LPIF) Specification, Version 1, Mar. 23, 2019, pp. 1-63.
Intel Corporation, "Compute Express Link, Specification, Mar. 2019, Revision 1.0," Mar. 2019, 206 pages.
Intel Corporation, Compute Express Link™ 2.0 White Paper, 4 pages.
Blankenship et al., U.S. Appl. No. 17/645,485 entitled System, Apparatus and Methods for Direct Data Reads From Memory filed Dec. 22, 2021 (43 pages).
Choudhary et al., U.S. Appl. No. 17/645,828 entitled Selection of Processing Mode for Receiver Circuit filed Dec. 23, 2021 (47 pages).
Korean Intellectual Property Office, International Search Report and Written Opinion for Appl. No. PCT/US2022/047966 dated Feb. 27, 2023 (10 pages).

* cited by examiner

SYSTEM, APPARATUS AND METHODS FOR PERFORMING SHARED MEMORY OPERATIONS

TECHNICAL FIELD BACKGROUND

Embodiments relate to accessing memory in a computing environment.

BACKGROUND

Modern computer systems may include any number of components, such as a central processing unit (CPU), memory, chipsets, and/or many other devices coupled together by interconnections (e.g., a computer bus, a network, etc.). An interconnection may transfer data between devices or components inside a computer, as well as between computers. For example, the interconnection may be used to read a data element from a memory, and provide the data element to a processor.

DETAILED DESCRIPTION

Some computing systems may implement interconnection protocols that provide the ability to dynamically add components such as memory, accelerators, and so forth. For example, some systems may implement interconnections and switches in accordance with a Compute Express Link (CXL) specification such as the CXL 1.1 Specification (or any future versions, modifications, variations or alternatives to a CXL specification). An example device that may implement the CXL specification is a switch device, which may provide capability for connecting multiple hosts to multiple memory devices. The CXL specification may allow the use of multiple coherency domains that may group multiple resources such as accelerators and memory devices. A host server (also referred to herein as a "host") may include one or multiple independent virtual hierarchies (VHs). No two hosts may share a virtual hierarchy.

In some situations, it may be desirable to share memory across independent hosts. Further, it may be desirable to implement atomic accesses in the shared memory. As used herein, the term "atomic access" refers to an access that is completed in a single step (i.e., relative to other processing threads). A switch device may be aware of multiple VHs. However, an access belonging to one VH may not be visible to another VH. Conventional approaches for coordinating atomic accesses across multiple VHs may involve using networking semantics, which may result in relatively high latency. Accordingly, using conventional approaches may result in relatively poor performance in some systems.

In various embodiments described herein, a control circuit of a memory device may include circuitry to perform memory sharing and atomic access using load-store semantics. In some embodiments, the control circuit may perform remote atomic operations for multiple coherence domains and multiple memory regions. For example, the control circuit may access multiple submission queues that store requests for operations in atomic memory locations. Further, the control circuit may determine whether to perform a requested operation based on the current ownership of the atomic memory location. Additionally, in some embodiments, the control circuit may use one or more directory structures to orchestrate cache coherency of shared memory across multiple coherence domains. If one or more requests cannot be completed due to a coherency conflict, the control circuit may issue a back invalidate command to cause a release of the current ownership, and may coordinate the completion of the pending request(s). In this manner, some embodiments may provide memory sharing and atomics across multiple device and domains using load-store semantics. Accordingly, sharing and atomics may be performed with relatively low latency, and/or with relatively high bandwidth.

Figure 1:
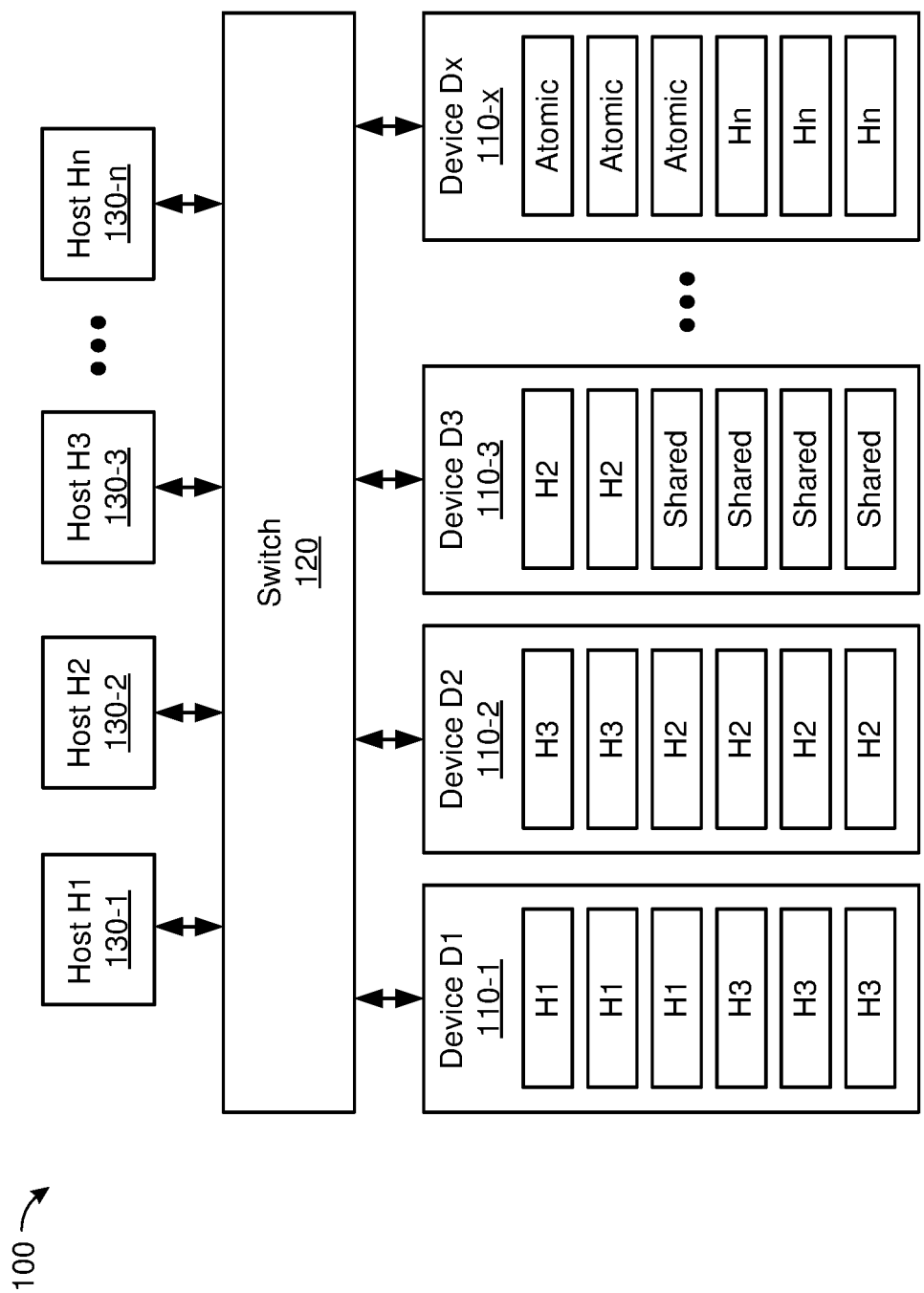
FIG. 1 is a block diagram of an example system in accordance with an embodiment.

FIG. 1—Example System

Referring now to FIG. 1, shown is a block diagram of an example system 100 in accordance with one or more embodiments. The system 100 may include a switch 120 coupled multiple hosts 131-1, 130-2, 130-3, 130-n (also referred to herein as "hosts 130"). The switch 120 may also be coupled to multiple devices 110-1, 110-2, 110-3, 110-x (also referred to herein as "device 110"). Each host 130 may include one or more virtual hierarchies that correspond to different cache coherence domains. In some embodiments, the devices 110, the switch 120, and the hosts 130 may operate in accordance with Compute Express Link (CXL) protocol(s).

In some embodiments, each device 110 may be a memory device (e.g., a Type 3 CXL memory expansion device) that may include any number of memory regions (e.g., defined partitions, memory ranges, etc.). As shown, device D1 110-1 may include memory regions assigned to host H1 130-1 and host H3 130-3, and device D2 110-2 may include memory regions assigned to host H2 130-2. Further, device D3 110-3 may include memory regions assigned to host H2 130-2, and may also include regions designated as shared memory. Device Dx 110-x may include memory regions assigned to host Hn 130-n, and may also include regions designated as atomic memory. The memory included in devices 110 may be implemented with any type(s) of computer memory (e.g., dynamic random-access memory (DRAM), static random-access memory (SRAM), non-volatile memory (NVM), a combination of DRAM and NVM, etc.).

In some embodiments, the shared memory regions (e.g., included in device D3 110-3) may be accessible to a specific set of hosts 130 using cache coherence states. For example, the coherence of a shared memory region may be maintained using modified, exclusive, shared, and invalid states. A shared memory region may be accessed by each host 130 (or VHs therein) that are sharing that region, subject to the access rights of each host 130 (or the VHs therein). For example, host H1 130-1 may only have read access to the shared memory region, while host H2 130-2 may have read and write access to the shared memory region. Further, in some embodiments, the atomic memory (e.g., included in device Dx 110-x) may be accessible to a specific set of hosts 130 using atomic operations that must be completed in a single step.

In some embodiments, the system 100 may implement atomic memory logic (e.g., hardware and/or software) to perform remote atomic operations for multiple coherence domains and multiple memory regions. A device 110 may include a separate submission queue for each host 130 (or a VH therein) that has access to the atomic memory regions hosted in that device 110. In some embodiments, the host 130 may submit an access request to its assigned submission queue on the device 110. The device 110 may read the request in the submission queue, and then determine and perform the appropriate action under the requirements of the atomic memory. Further, in some embodiments, the system 100 may implement shared memory logic to perform memory sharing for multiple hosts 130 and devices 110. The device 110 may use one or more directory structures to orchestrate cache coherency across multiple coherence domains. If one or more requests cannot be completed due to a coherency conflict, the device 110 may issue a back invalidate command to cause a release of the current ownership, and may coordinate the completion of the pending request(s). Accordingly, the system 100 may provide memory sharing and atomic accesses using load-store semantics. The memory sharing and atomic access functionality of the system 100 is described further below with reference to FIGS. 2-5.

It is noted that, although some examples are described herein in connection to the Compute Express Link (CXL) specification, embodiments are not limited in this regard. For example, it is contemplated that various embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

Figure 2:
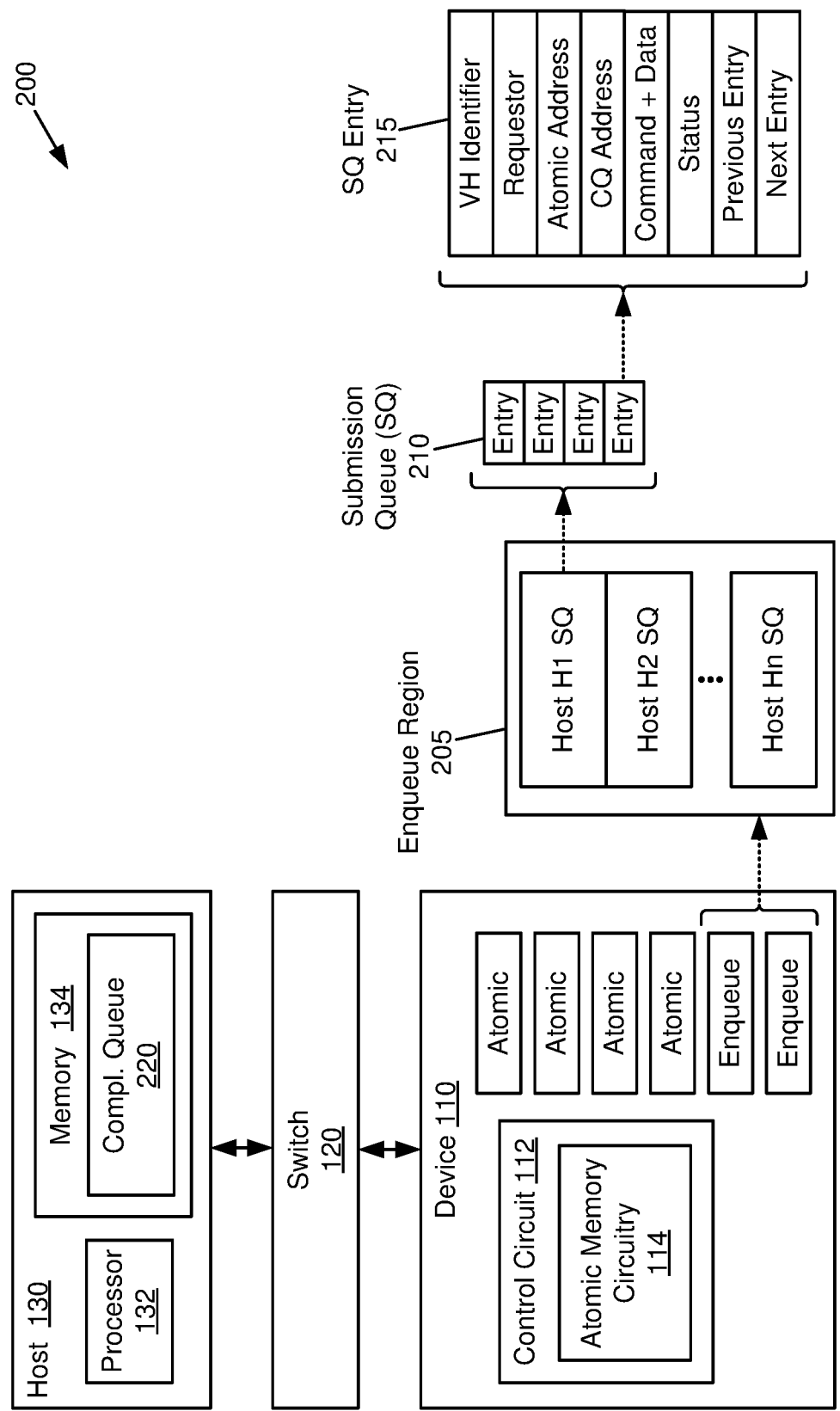
FIG. 2 is a block diagram of an example system in accordance with an embodiment.

FIG. 2—Example System

Referring now to FIG. 2, shown is an example system 200 for atomic memory access, in accordance with one or more embodiments. The system 200 may correspond to a representative portion of the system 100, and may include a device 110, a switch 120, and a host 130 (discussed above with reference to FIG. 1). The host 130 may include a processor 132 and memory 134. The processor 132 may be a hardware processing device (e.g., a central processing unit (CPU), a System on a Chip (SoC), and so forth), and may include one or more processing engines (not shown). The memory 134 may include any type of computer memory (e.g., dynamic random-access memory (DRAM), static random-access memory (SRAM), non-volatile memory (NVM), a combination of DRAM and NVM, etc.).

The device 110 may include a control circuit 112 that may be implemented in hardware (e.g., a microprocessor, a microcontroller, a programmable integrated circuit, a programmable gate array, a digital signal processor, etc.) and machine-readable instructions (software and/or firmware). In some embodiments, the control circuit 112 may include atomic memory circuitry 114 to perform remote atomic operations across multiple coherence domains and multiple memory regions. Example methods for performing atomic operations are discussed below with reference to FIGS. 3A-3B.

As shown in FIG. 2, the device 110 may include memory region(s) that are designated or reserved for use as atomic memory. Further, the device 110 may include memory region(s) that are used as an enqueue region 205. In some embodiments, the enqueue region 205 may include a submission queue (SQ) 210 for each host 130 (e.g., hosts H1-Hn shown in FIG. 1) that has access to the atomic memory of the device 110. As illustrated in FIG. 2, each submission queue 210 may include multiple SQ entries 215. In some embodiments, an SQ entry 215 may be generated when an initiator (e.g., a host 130, a device 110, a VH, and so forth) submits an access request using delayed memory write (DMWr) semantics.

In some embodiments, each SQ entry 215 may represent a particular access request for a particular atomic memory location of the device 110, and may therefore include multiple fields to store data associated with the corresponding request. For example, the SQ entry 215 may include fields to store data associated with a request initiator (e.g., a host 130), such as a virtual hierarchy identifier ("VHID"), bus number, device number, function number, process address space identifier (PASID), and so forth. Further, the SQ entry 215 may include fields to store the virtual address (VA) of the requested atomic memory location (e.g., a cache line), a command and data associated with the requested atomic operation, and a current status of the request. In some embodiments, the request may be prepended with the VHID by the switch 120 (e.g., a CXL switch) on an ingress port (e.g., connected to the initiator host 130). The virtual address of the requested atomic memory location may be different from its device physical address. For example, each requester (e.g., a host or VH) may assign a different virtual address to the same atomic memory location.

In one or more embodiments, the submission queue 210 may be implemented as a double linked list of SQ entries 215, where each SQ entry 215 is linked to the preceding SQ entry 215 and the following SQ entry 215. Accordingly, in such embodiments, the SQ entry 215 may include fields to store an identifier for the preceding entry 215 in the submission queue 210, and an identifier for the following entry 215 in the submission queue 210.

In some embodiments, the memory 134 may store a completion queue (CQ) 220 to store notifications of each granted access to atomic memory. Accordingly, in such embodiments, the SQ entry 215 may include a field to store the address of the completion queue that the device 110 should post to once the initiator is given access to the atomic region, and a value to post to the completion queue.

In one or more embodiments, when a requester is granted access to a particular atomic memory location, a write to the atomic memory location may be performed to store information fields identifying that requester (also referred to herein as "requester information"). For example, the stored requester information fields may include the virtual hierarchy identifier ("VHID"), a bus identifier, a device identifier, a function identifier, request data, and so forth. Subsequently, when the ownership of the atomic memory location is released, the stored requester information fields may be deleted or overwritten (e.g., by a null value or a zero).

Figure 3A:
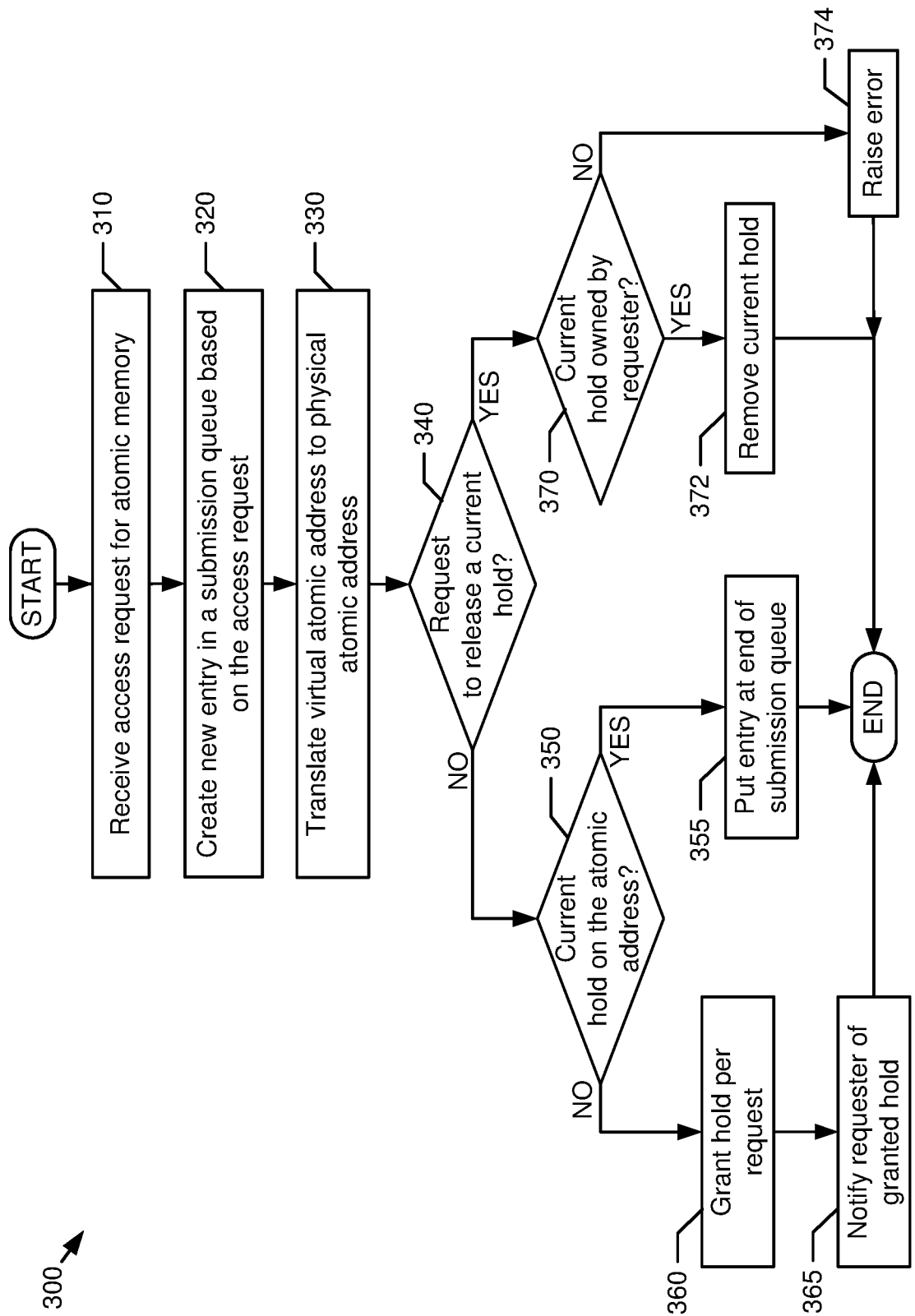
FIG. 3A is a flow diagram of an example method in accordance with one or more embodiments.

FIG. 3A—Example Method for Performing Atomic Operations

Referring now to FIG. 3A, shown is a flow diagram of a method 300 for performing remote atomic operations, in accordance with one or more embodiments. In various embodiments, the method 300 may be performed by processing logic (e.g., atomic memory circuitry 114 shown in FIG. 2) that may include hardware (e.g., processing device, circuitry, dedicated logic, programmable logic, microcode, etc.), software (e.g., instructions run on a processing device), or a combination thereof. In firmware or software embodiments, the method 300 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method. For the sake of illustration, the details involved in the method 300 may be described below with reference to FIGS. 1-2, which show examples in accordance with one or more embodiments. However, the scope of the various embodiments discussed herein is not limited in this regard.

Block 310 may include receiving an access request for an atomic memory location. Block 320 may include creating a new entry in a submission queue based on the access request. Block 330 may include translating a virtual atomic address to a physical atomic address. For example, referring to FIGS. 1-2, a particular host 130 may request access to an atomic memory location in a device 110. The host 130 may make the access request by writing an SQ entry 215 in the submission queue 210 device 110 that is associated with that particular host 130. In some examples, writing the SQ entry 215 may involve transmitting a delayed memory write (DMWr) request to the atomic memory circuitry 114 of the device 110. The atomic memory circuitry 114 may determine whether there is enough space in the submission queue 210 to add the new SQ entry 215. If so, the atomic memory circuitry 114 may add the new SQ entry 215 to the submission queue 210, and may send a success notification to the requester (i.e., the host 130). In some embodiments, the atomic memory circuitry 114 may add the new SQ entry 215 to the tail end of a doubly-linked that forms the submission queue 210, and may update previous entry and following entry fields of the new SQ entry 215 accordingly. Further, the atomic memory circuitry 114 may translate the virtual atomic address specified in the request (i.e., identifying the requested atomic memory location) into the device physical atomic address. The virtual memory address may be an address used internally by the requester (e.g., a host or VH), and may be different for each requester. In some embodiments, the atomic memory circuitry 114 may then remove the SQ entry 215 from the submission queue 210 (e.g., from a doubly-linked list) during at least some subsequent actions (e.g., during some or all of blocks 340-374 shown in FIG. 3A).

Referring again to FIG. 3A, decision block 340 may include determining whether the received request is to release a current hold. For example, referring to FIGS. 1-2, the atomic memory circuitry 114 may determine whether the completer address in the SQ entry 215 is a value (e.g., "0") that indicates a request to release an existing hold of the atomic memory. In another example, the atomic memory circuitry 114 may determine whether a dedicated bit is set in the received request to indicate a requested release of an existing hold of the atomic memory. In some embodiments, the hold may be implemented in a semaphore element.

Referring again to FIG. 3A, if it is determined at decision block 340 that the received request is to release a current hold ("YES"), the method 300 may continue at decision block 370, including determining whether the current hold is owned by the requester. If so, then the method 300 may continue at block 372, including removing the current hold. Otherwise, if it is determined that the current hold is not owned by the requester, then the method 300 may continue at block 374, including raising an error. After block 372 or block 374, the method 300 may be completed. For example, referring to FIGS. 1-2, the atomic memory circuitry 114 may determine whether requester information fields stored in the requested atomic memory location matches requester information fields included in the SQ entry 215. The requester information fields may include the virtual hierarchy identifier ("VHID"), bus number, device number, function number, and data included in the SQ entry 215. If the two sets of requester information fields match, it may be determined that the requester is the valid owner of the current hold, and therefore the atomic memory circuitry 114 may remove the current hold from the atomic memory (e.g., is made available for access). Otherwise, if the two sets of requester information fields do not match, it may be determined that the requester is not the valid owner of the current hold, and therefore the atomic memory circuitry 114 may deny the request. Further, the atomic memory circuitry 114 may cause an error to be logged, and may notify a responsible entity (e.g., a fabric manager) of the logged error. In some embodiments, after either removing the current hold or logging an error, the atomic memory circuitry 114 may release the SQ entry 215 to a free list.

Referring again to FIG. 3A, if it is determined at decision block 340 that the received request is not to release a current hold ("NO"), the method 300 may continue at decision block 350, including determining whether there is a current hold on the requested atomic address. If so, then the method 300 may continue at block 355, including putting the entry at a tail of the submission queue. Otherwise, if it is determined that there is not a current hold on the requested atomic address, then the method 300 may continue at block 360, including granting a hold per the request. Further, block 365 may include notifying the requester of the granted hold. After block 355 or block 365, the method 300 may be completed.

For example, referring to FIGS. 1-2, the atomic memory circuitry 114 may determine whether the requested atomic memory location includes valid requester information fields (e.g., VHID, bus number, device number, function number, data). If the requested atomic memory location includes valid requester information fields, it may be determined that the current hold belongs to another requester, and the atomic memory circuitry 114 may insert the SQ entry 215 at the tail end of the submission queue 210. Otherwise, if the requested atomic memory does not include valid requester information fields (e.g., includes a null value or a zero value), it may be determined that there is no current hold on the requested atomic memory, and therefore the atomic memory circuitry 114 may grant the request (e.g., by performing the atomic operation and granting a hold on the atomic memory to the requester). Further, the atomic memory circuitry 114 may update the requester information fields stored in the atomic memory location to include the values of the corresponding fields of the SQ entry 215 (e.g., VHID, bus number, device number, function number, PASID) and values of the associated atomic operation (e.g., command and data values). The atomic memory circuitry 114 may then schedule a direct memory access (DMA) to write to the completion queue 220 (e.g., based on the CQ address provided in the SQ entry 215), which may include any data resulting from performing the atomic operation. In some embodiments, the atomic memory circuitry 114 may update the status field and the pointer field in the requested atomic memory (e.g., next pointer may be set to be NULL), and may release the SQ entry 215 to a free list.

Figure 3B:
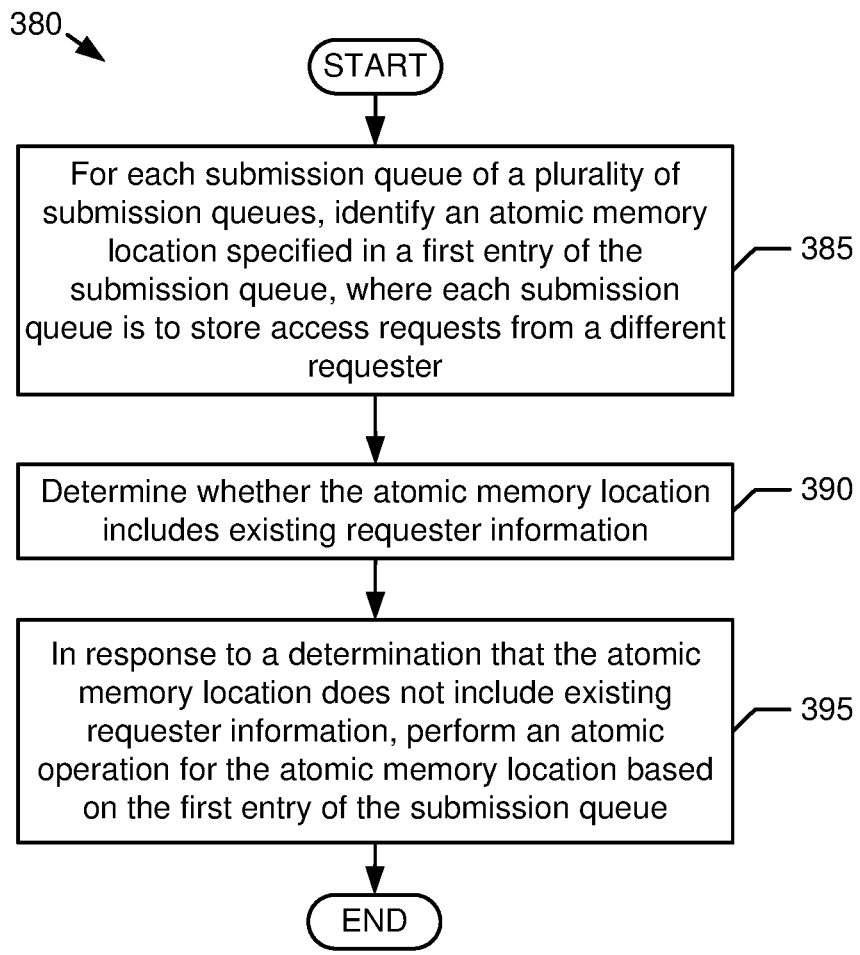
FIG. 3B is a flow diagram of an example method in accordance with one or more embodiments.

FIG. 3B—Example Method for Performing Atomic Operations

Referring now to FIG. 3B, shown is a flow diagram of a method 380 for performing remote atomic operations, in accordance with one or more embodiments. In various embodiments, the method 380 may be performed by processing logic (e.g., atomic memory circuitry 114 shown in FIG. 2) that may include hardware (e.g., processing device, circuitry, dedicated logic, programmable logic, microcode, etc.), software (e.g., instructions run on a processing device), or a combination thereof. In firmware or software embodiments, the method 300 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method. For the sake of illustration, the details involved in the method 380 may be described below with reference to FIGS. 1-2, which show examples in accordance with one or more embodiments. However, the scope of the various embodiments discussed herein is not limited in this regard.

As shown in FIG. 3B, block 385 may include, for each submission queue of a plurality of submission queues, identifying an atomic memory location specified in a first entry of the submission queue, where each submission queue is to store access requests from a different requester. Block 390 may include determining whether the atomic memory location includes existing requester information. Block 395 may include, in response to a determination that the atomic memory location does not include existing requester information, performing an atomic operation for the atomic memory location based on the first entry of the submission queue. After block 395, the method 380 may be completed.

For example, referring to FIGS. 1-2, the atomic memory circuitry 114 may access read a first SQ entry 215 included in a particular submission queue 210 (e.g., (e.g., the SQ entry 215 at the head or highest priority position of the SQ 210), and may reads the requested atomic memory location from the first SQ entry 215. The atomic memory circuitry 114 may determine the requested atomic memory location already includes stored requester information fields (e.g., VHID, bus number, device number, function number, and data fields). If so, the atomic memory circuitry 114 may determine that the requested atomic memory location is in use for an atomic operation by another requester (i.e., as identified by the existing requester information in the first SQ entry 215). Otherwise, the requested atomic memory location does not include stored requester information fields, the atomic memory circuitry 114 may determine that the requested atomic memory location is not in current use for an atomic operation. Accordingly, the atomic memory circuitry 114 may perform the atomic operation specified in the first SQ entry 215, including granting ownership of the atomic memory location to the requester associated with the first SQ entry 215.

In one or more embodiments, the methods 300 and/or 380 may be extended to allow for general purpose atomic operations to be performed on a destination address. Such operations could be provided from an application program interface (API). Such operations or commands may allow for general communications or shared computation through the use of shared atomic memory. For example, these operations may include use of fields such as same-source information (e.g., using VHID, PASID), operation code ("opcode") (e.g., defining operations such as Minimum, Maximum, Add, Bitwise-OR, Bitwise-XOR, etc.), data type (e.g., 8-bit integer, 16-bit integer, 32-bit integer, 32-bit float, 64-bit float, etc.), operand (e.g., size matched to data type), completion required (e.g., a bit set to indicate whether a data complete message is required), and completion queue address.

Figure 4:
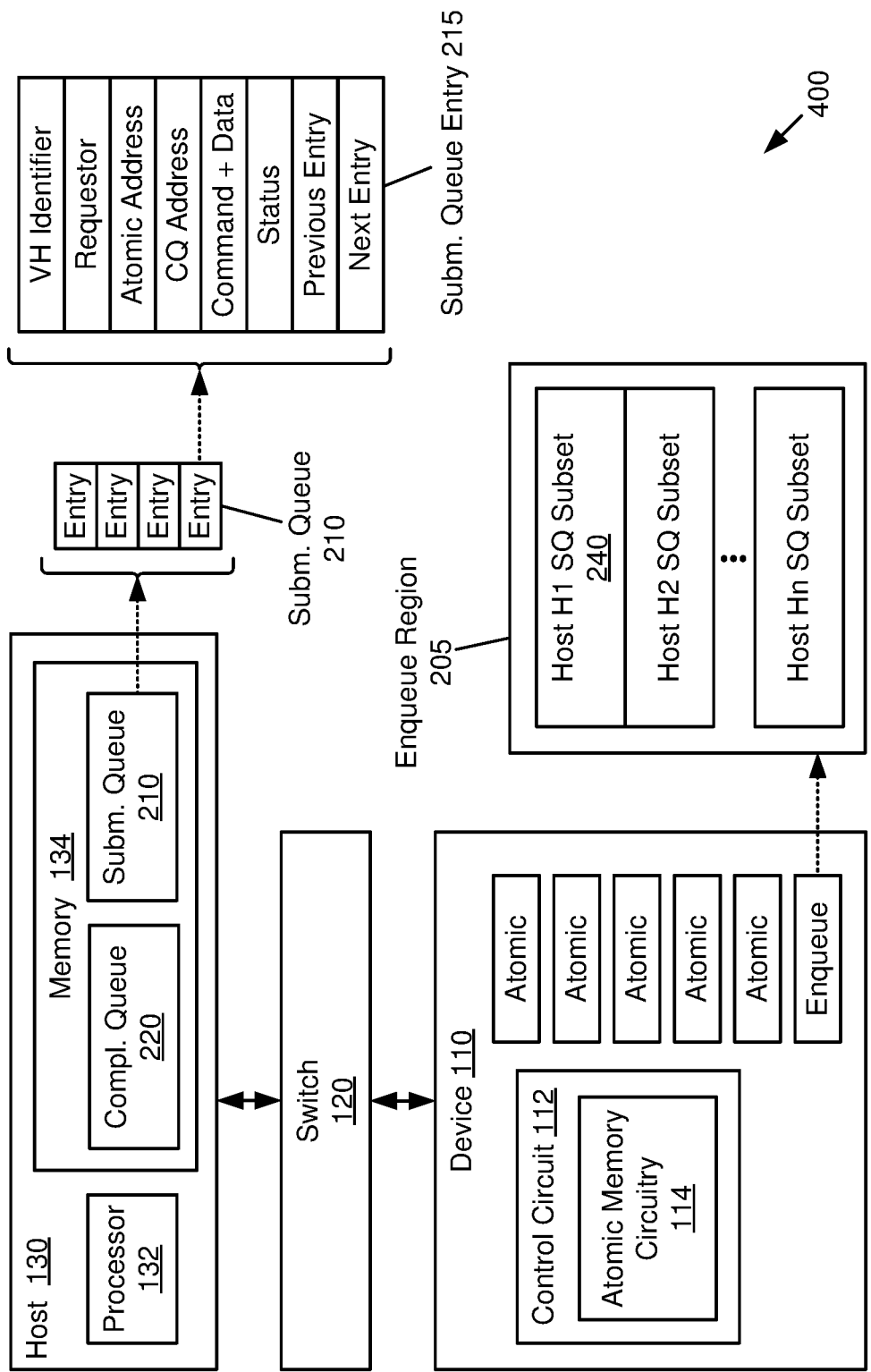
FIG. 4 is a block diagram of an example system in accordance with an embodiment.

FIG. 4—Example System

Referring now to FIG. 4, shown is an example system 400 for atomic memory access, in accordance with one or more embodiments. The example system 400 may be similar in some respects to the example system 200 (discussed above with reference to FIG. 2). However, in the example system 400, the submission and completion queue may be mapped into each host's (or VH's) local memory space. As illustrated in FIG. 4, in the example system 400, the submission queue 210 may be included in the memory 134 of the host 130. Further, the enqueue region 205 of the device 110 may include a subset 240 of the submission queue 210 (e.g., the most recent entry 215) of each host 130. For example, the SQ subset 240 of host H1 may include a subset of the SQ entries 215 from the submission queue 210 of Host H1. In another example, the SQ subset 240 may include only the most recent SQ entry 215 from the submission queue 210, a pointer to a recent SQ entry 215, and so forth. In some embodiments, a local DMA engine in each host 130 may detect a new entry 215 in the submission queue 210 within its memory 134, and in response may perform a delayed memory write (DMWr) of the new entry 215 to the enqueue region 205 (or a reduced submission queue) of the device 110. In this manner, a processing engine of the device 110 does not need to issue the delayed memory write, which may become blocked until a completion is detected. Accordingly, the processing engine may queue the access requests in its local cache, and the DMA engine may handle the processing of the request.

Figure 5:
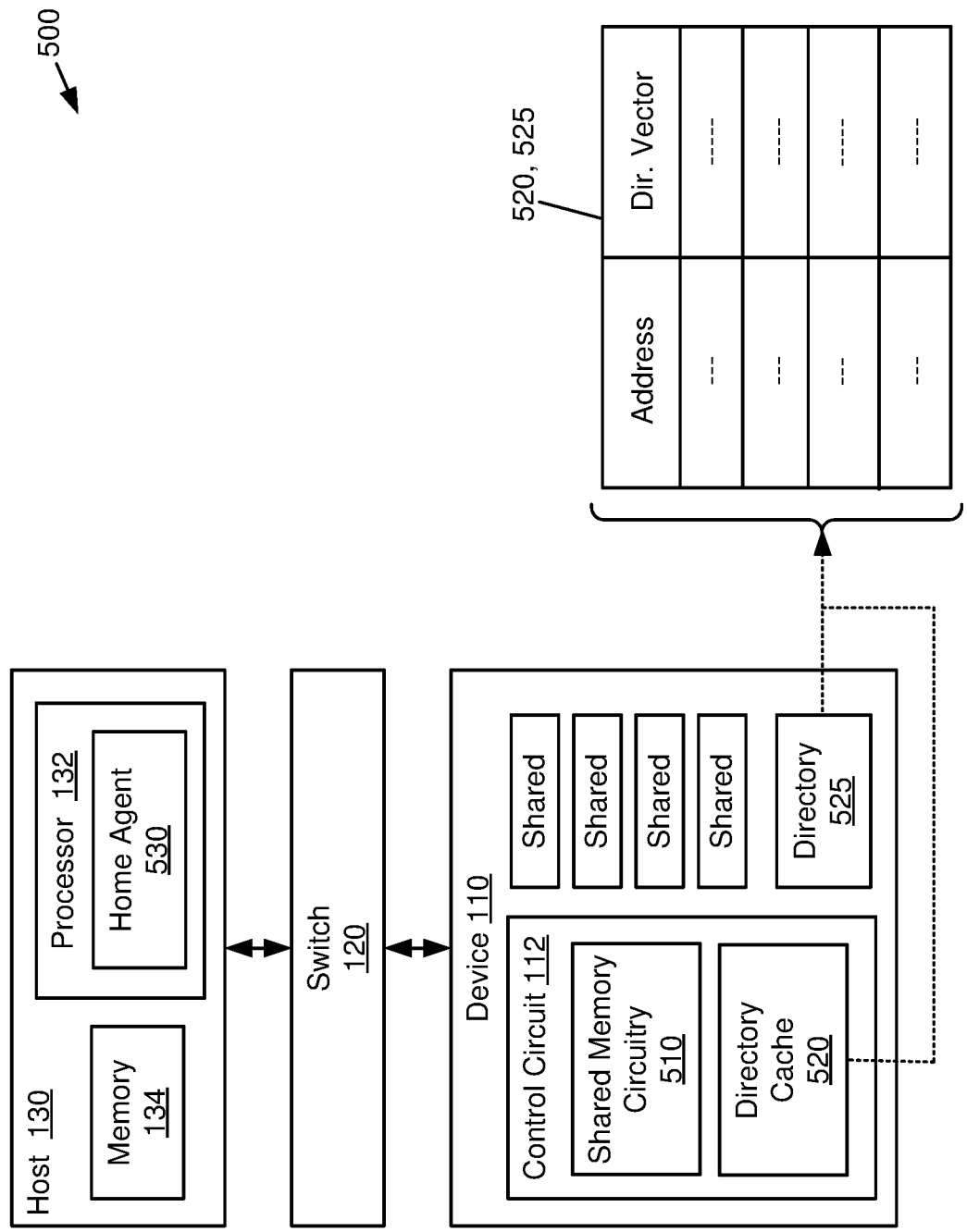
FIG. 5 is a block diagram of an example system in accordance with an embodiment.

FIG. 5—Example System

Referring now to FIG. 5, shown is an example system 400 for shared memory access, in accordance with one or more embodiments. The system 500 may correspond generally to systems 100, 200, and 400 (discussed above with reference to FIGS. 1-2 and 4), and may include a device 110, a switch 120, and a host 130. It is contemplated that the systems 200 or 400 may be combined at least in part with the system 500 shown in FIG. 5.

In some embodiments, the system 500 may implement shared memory logic to orchestrate cache coherency across multiple coherence domains. As shown, the control circuit 112 of the device 110 may include shared memory circuitry 510 and a directory cache 520 that are implemented in hardware. The device 110 may also include a directory 525 stored in one or more memory regions. Further, the processor 132 of the host 130 may include a home agent 530 to manage a coherency domain of the host 130.

In some embodiments, the shared memory circuitry 510 may use one or more directory structures (e.g., the directory cache 520 and/or the directory 525) to track ownership of shared memory regions across multiple coherence domains. For example, the directory structures may use standard modified, exclusive, shared, and invalid (MESI) coherency states. In some embodiments, the system 500 may be implemented using only one of the directory cache 520 or the directory 525. Alternatively, the system 500 may be implemented using the directory 525 as back-up to the directory cache 520 (e.g., to avoid directory updates on every access). In some embodiments, the directory cache 520 may be implemented as a hardware snoop filter included in the control circuit 112.

As shown in FIG. 5, in some embodiments, the directory cache 520 and/or the directory 525 may include multiple directory entries that each correspond to a particular memory page. Further, each directory entry may include a directory vector to indicate the coherence state of multiple shared memory locations (e.g., cache lines) for each page. Each directory vector may include a series of encoded bits or values that identify the current state of a corresponding shared memory location (or a set of shared memory locations). For example, the directory vector may identify an invalid state (e.g., if no host has ownership), a shared state along with an identification of the entities (e.g., hosts or VHs) are sharing the shared memory location, and an exclusive state along with an identification of the entity that currently has the ownership of the shared memory location.

In some embodiments, the directory 525 may be included in the shared memory location (e.g., cache line), or may be explicitly tracked as a separate structure. Further, in some embodiments, a waiting list (not shown in FIG. 5) may be maintained in memory along with the directory 525 to track all pending requests for the host 130. The waiting list may include a cache tag and other relevant information that may be used to remove the pending request to avoid head of line blocking.

In some embodiments, the shared memory circuitry 510 may detect coherency conflicts that may prevent completion of one or more requests. For example, a coherency conflict may occur when a request for exclusive ownership of a memory location is received, but other requesters already have exclusive or shared ownership of that memory location. Further, a coherency conflict may occur when a request for shared ownership of a memory location is received, but another requester already has exclusive ownership of that memory unit. In response to detecting such coherence conflicts, the shared memory circuitry 510 may issue a back invalidate command (e.g., a CXL back invalidate command) to cause a release of the current ownership. The shared memory circuitry 510 may then wait for a response to the back invalidate command before serving the request. Optionally, the shared memory circuitry 510 may remove the request from the queue and place it in memory. If a different requester asks for ownership for the same memory location before the preceding request is served, the shared memory circuitry 510 may queue the subsequent request to the waiting list. The shared memory circuitry 510 may then wait until the preceding request is completed before determining whether to process the subsequent request.

In some embodiments, the shared memory circuitry 510 may wait for a specified time period to determine whether the expected response to the back invalidate command has timed. For example, the expected response may time out in the event of a system failure or fatal error in the host that received the back invalidate command. In such situation, the shared memory circuitry 510 may initiate a process to "poison" (e.g., delete or remove from active use) the requested memory location. For example, the shared memory circuitry 510 may wait for any other pending back invalidate commands for the requested memory location to complete or time-out, and may then mark or designate the memory location as poisoned. The shared memory circuitry 510 may reset the ownership list of the memory location, and may communicate an error message to a managing entity (e.g., a fabric manager). In some examples, the managing entity may read a directory list to determine whether the time-out is associated with a memory unit that was held in exclusive or shared ownership. Further, the managing entity may inform all hosts using that memory location to gracefully terminate their respective access processes, and may provide the state associated with the time-out event. The managing entity may wait for responses from the affected hosts, perform a cleaning process for the memory location, and then release the cleaned memory location for additional use. No write operations are allowed to occur for the memory location until the cleaning process is completed. Any requests that are received for the poisoned data and associated information may be passed on to the managing entity. As with pooled memory, the switch 120 may be responsible for mapping the addresses coming from each host to the device address for the shared memory.

In some embodiments, the host 130 may use shared memory logic to perform atomic operations across memory. For example, the host 130 may obtain exclusive ownership of a memory location (e.g., a cache line) at time of receiving an instruction, or through a prefetch process. The host 130 may then perform atomic operations in its internal cache. If the memory location is still held exclusive in its cache, the host 130 may perform the intended atomic operation. Otherwise, if the memory location is not held exclusive in its cache, the host 130 may perform another request for the memory location.

Figure 6:
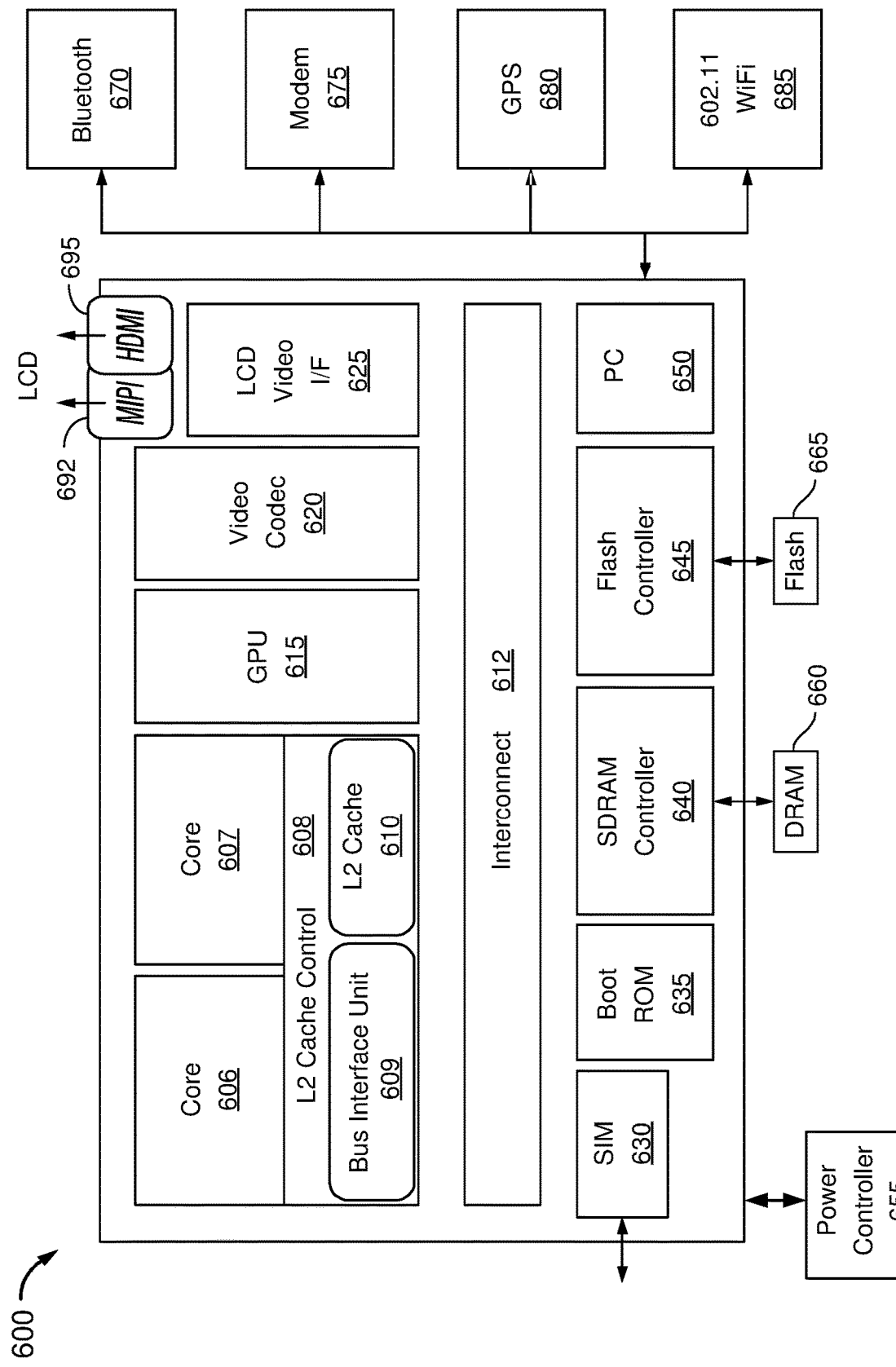
FIG. 6 is a block diagram of an example system in accordance with an embodiment.

FIG. 6—Example System

Referring now to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache controller 608 that is associated with bus interface unit 609 and L2 cache 610 to communicate with other parts of system 600 via an interconnect 612.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash 665), a peripheral controller 650 (e.g., an eSPI interface) to interface with peripherals, video codec 620 and video interface 625 to display and receive input (e.g., touch enabled input), GPU 615 to perform graphics related computations, etc. In addition, the system illustrates peripherals for communication, such as a Bluetooth module 670, 3G modem 675, GPS 680, and WiFi 685. Also included in the system is a power controller 655, which may implement circuitry described herein to perform CXL-based power sharing in accordance with an embodiment. Further illustrated in FIG. 6, system 600 may additionally include interfaces including a MIPI interface 692, e.g., to a display and/or an HDMI interface 695 also which may couple to the same or a different display.

Figure 7:
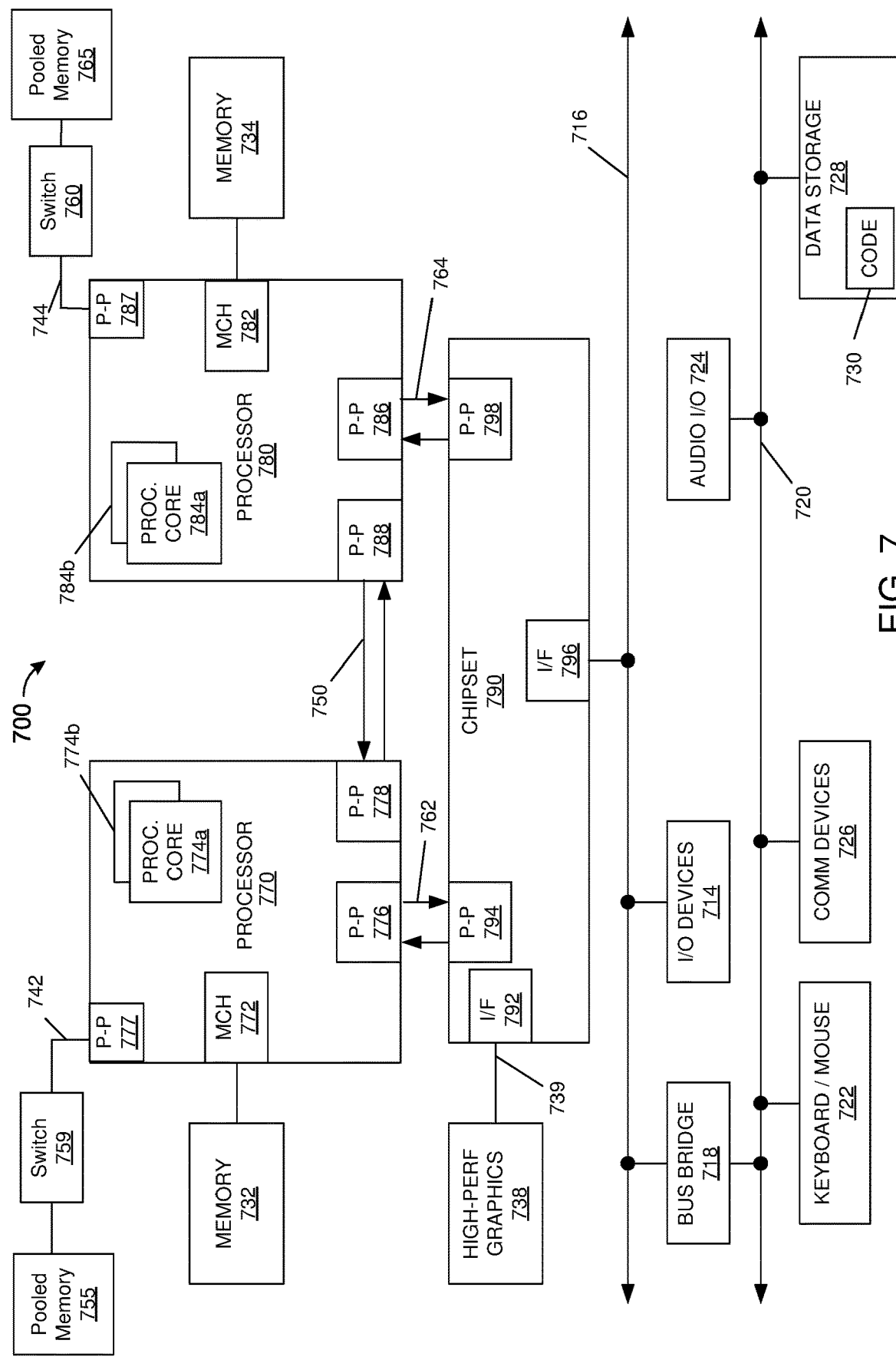
FIG. 7 is a block diagram of an example system in accordance with an embodiment.

FIG. 7—Example System

Referring now to FIG. 7, shown is a block diagram of a system in accordance with another embodiment such as an edge platform. As shown in FIG. 7, multiprocessor system 700 includes a first processor 770 and a second processor 780 coupled via an interconnect 750, which in an embodiment can be an optical interconnect that communicates with optical circuitry (which may be included in or coupled to processors 770). As shown in FIG. 7, each of processors 770 and 780 may be many core processors including representative first and second processor cores (i.e., processor cores 774a and 774b and processor cores 784a and 784b).

In the embodiment of FIG. 7, processors 770 and 780 further include point-to point interconnects 777 and 787, which couple via interconnects 742 and 744 (which may be CXL buses) to switches 759 and 760. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Figure 8:
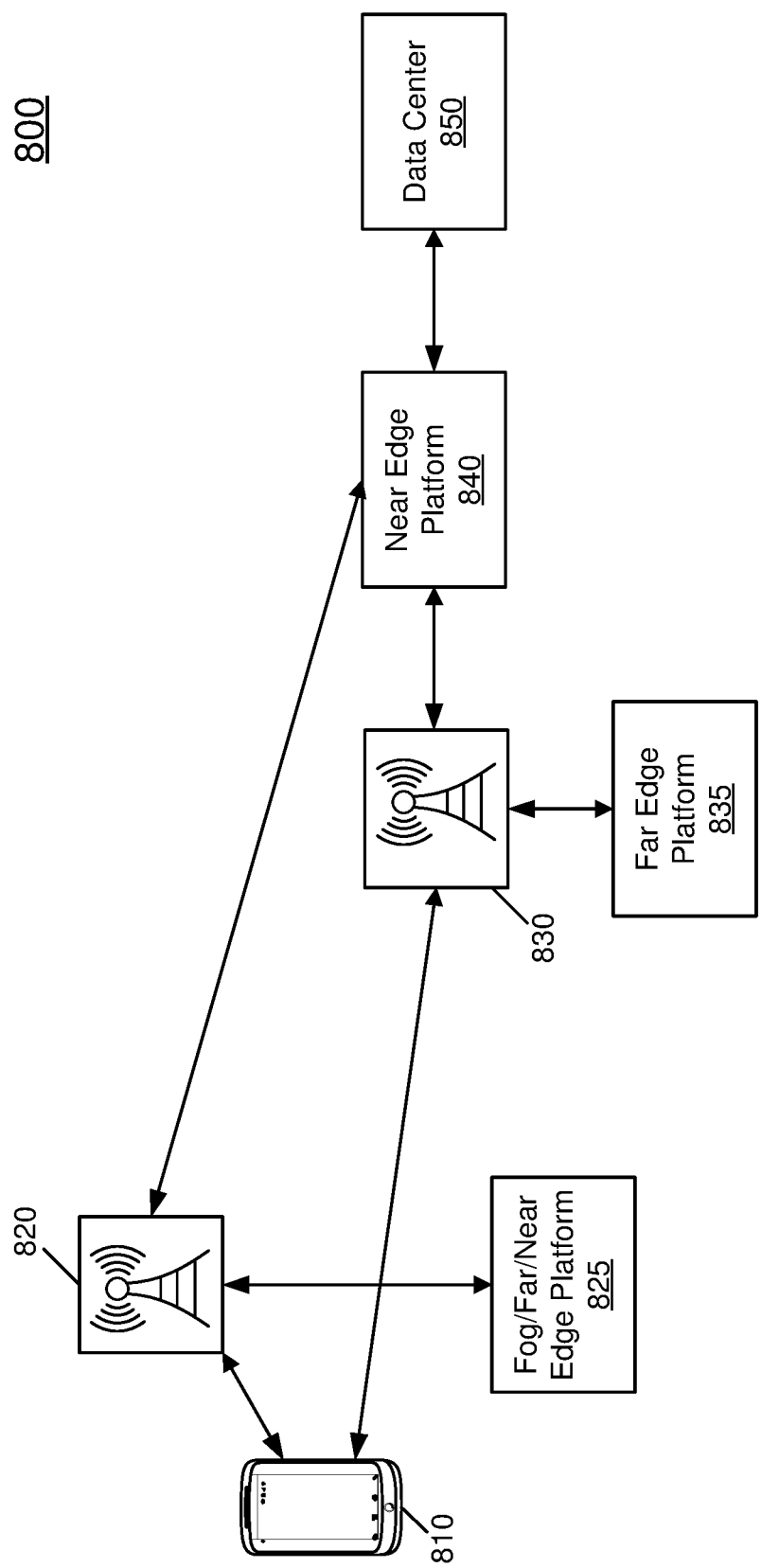
FIG. 8 is a block diagram of an example system in accordance with an embodiment.

FIG. 8—Example System

Embodiments as described herein can be used in a wide variety of network architectures. Referring now to FIG. 8, shown is a block diagram of a network architecture in accordance with another embodiment of the present invention. As shown in FIG. 8, network architecture 800 includes various computing platforms that may be located in a very wide area.

In the high-level view of FIG. 8, network architecture 800 includes a representative device 810, such as a smartphone. This device may communicate via different radio access networks (RANs), including a RAN 820 and a RAN 830. RAN 820 in turn may couple to a platform 825, which may be an edge platform such as a fog/far/near edge platform, and which may leverage embodiments herein. Other requests may be handled by a far edge platform 835 coupled to RAN 830, which also may leverage embodiments.

As further illustrated in FIG. 8, another near edge platform 840 may couple to RANs 820, 830. Note that this near edge platform may be located closer to a data center 850, which may have a large amount of computing resources. By pushing messages to these more remote platforms, greater latency is incurred in handling requests on behalf of edge device 810. Understand that one more of the platforms shown in FIG. 8 may incorporate embodiments to perform CXL-based power sharing as described herein.

Figure 9:
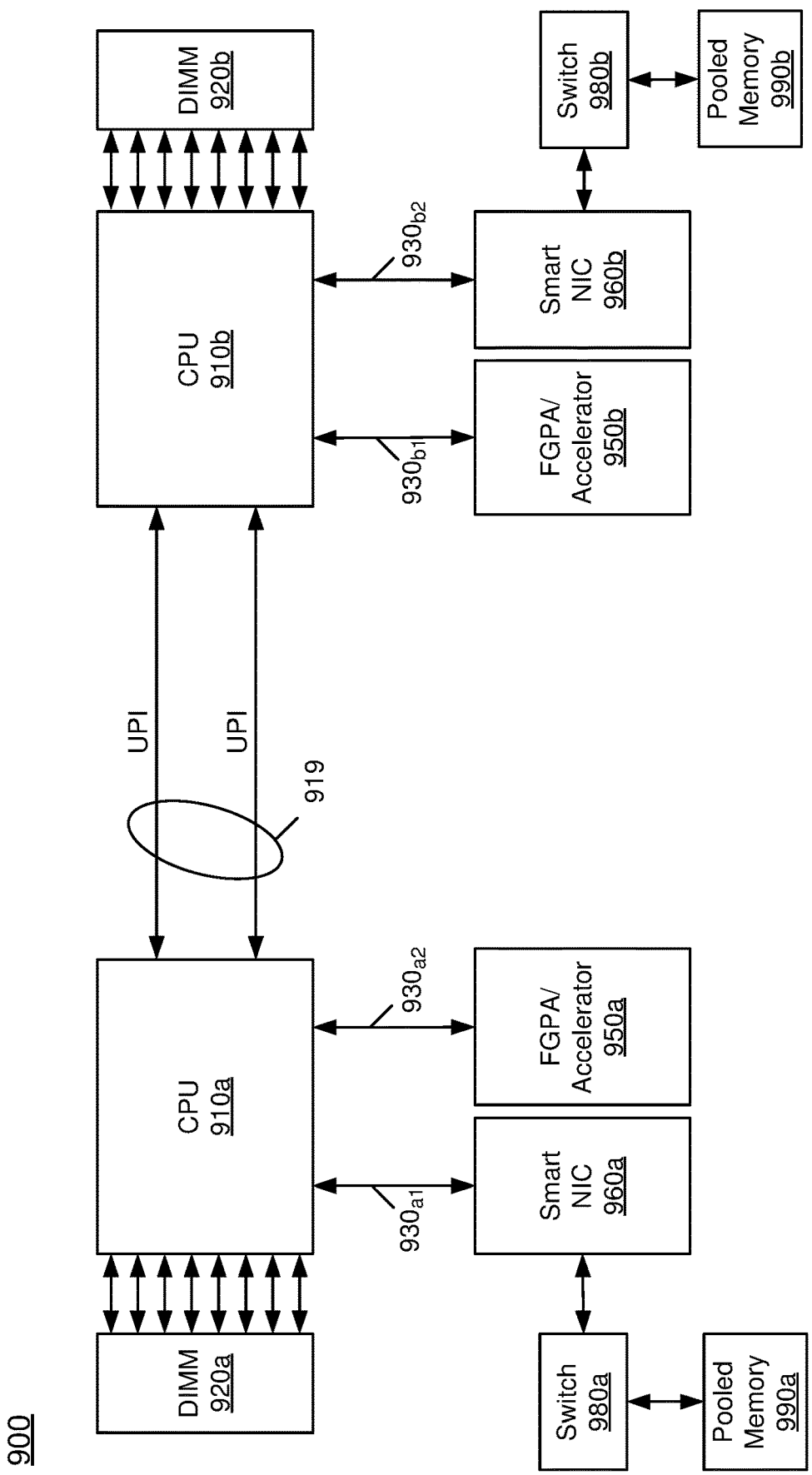
FIG. 9 is a block diagram of an example system in accordance with an embodiment.

FIG. 9—Example System

Referring now to FIG. 9, shown is a block diagram of a system 900 in accordance with another embodiment of the present invention. As shown in FIG. 5, the system 900 may be any type of computing device, and in one embodiment may be a server system. In the embodiment of FIG. 9, system 900 includes multiple CPUs 910a,b that in turn couple to respective system memories 920a,b which in embodiments may be implemented as DIMMs such as double data rate (DDR) memory, persistent or other types of memory. Note that CPUs 910 may couple together via an interconnect system 915 such as an Intel® Ultra Path Interconnect or other processor interconnect technology.

To enable coherent accelerator devices and/or smart adapter devices to couple to CPUs 910 by way of potentially multiple communication protocols, a plurality of interconnects 930a1-b2 may be present. In an embodiment, each interconnect 930 may be a given instance of a CXL.

In the embodiment shown, respective CPUs 910 couple to corresponding field programmable gate arrays (FPGAs)/accelerator devices 950a,b (which may include GPUs, in one embodiment. In addition CPUs 910 also couple to smart NIC devices 960a,b. In turn, smart NIC devices 960a,b couple to switches 980a,b (e.g., CXL switches in accordance with an embodiment) that in turn couple to a pooled memory 990a,b such as a persistent memory. In embodiments, switches 980 may implement circuitry described herein to perform methods as described herein. Of course, embodiments are not limited to switches and the techniques described herein may be performed by other entities of a system, including CPUs 910.

The following clauses and/or examples pertain to further embodiments.

In Example 1, an apparatus for memory access may include: a memory comprising at least one atomic memory region, and a control circuit coupled to the memory, The control circuit may be to: for each submission queue of a plurality of submission queues, identify an atomic memory location specified in a first entry of the submission queue, wherein each submission queue is to store access requests from a different requester; determine whether the atomic memory location includes existing requester information; and in response to a determination that the atomic memory location does not include existing requester information, perform an atomic operation for the atomic memory location based at least in part on the first entry of the submission queue.

In Example 2, the subject matter of Example 1 may optionally include that the control circuit is further to, in response to the determination that the atomic memory location does not include existing requester information, write new requester information to the atomic memory location.

In Example 3, the subject matter of Examples 1-2 may optionally include that the new requester information is included in the first entry of the submission queue, and that the new requester information comprises at least a virtual hierarchy identifier, a bus identifier, a device identifier, and a function identifier.

In Example 4, the subject matter of Examples 1-3 may optionally include that the control circuit is further to, in response to a determination that the atomic memory location does include existing requester information, move the first entry to a tail end of the submission queue.

In Example 5, the subject matter of Examples 1-4 may optionally include that the plurality of submission queues are stored in an enqueue memory region of the apparatus.

In Example 6, the subject matter of Examples 1-5 may optionally include that each submission queue of the plurality of submission queues is stored in local memory of a different host device.

In Example 7, the subject matter of Examples 1-6 may optionally include that the control circuit includes a directory cache, and that the control circuit is to coordinate coherence across a plurality of cache coherence domains using the directory cache.

In Example 8, the subject matter of Examples 1-7 may optionally include that each entry of the directory cache comprises a directory vector, and that each directory vector is to indicate coherency states and owner entities of a plurality of shared memory locations.

In Example 9, the subject matter of Examples 1-8 may optionally include that the control circuit is to, in response to a determination that a requested shared memory location is exclusively owned by an entity: issue a back invalidate command to the entity.

In Example 10, a method for memory access may include: accessing, by a control circuit of a device, a plurality of submission queues, where each submission queue is to store access requests from a different requester coupled to the device; for each submission queue of the plurality of submission queues, identifying, by the control circuit, an atomic memory location specified in a first entry of the submission queue; determining, by the control circuit, whether the atomic memory location includes existing requester information; and in response to a determination that the atomic memory location does not include existing requester information, performing, by the control circuit, an atomic operation for the atomic memory location based on the first entry of the submission queue.

In Example 10, the subject matter of Example 10 may optionally include: in response to the determination that the atomic memory location does not include existing requester information, writing new requester information to the atomic memory location.

In Example 12, the subject matter of Examples 10-11 may optionally include that the new requester information is included in the first entry of the submission queue, and that the new requester information comprises at least a virtual hierarchy identifier, a bus identifier, a device identifier, and a function identifier.

In Example 13, the subject matter of Examples 10-12 may optionally include that the plurality of submission queues are stored in an enqueue memory region of the device.

In Example 14, the subject matter of Examples 10-13 may optionally include coordinating, by the control circuit, coherence across a plurality of cache coherence domains using a directory cache included in the control circuit.

In Example 15, the subject matter of Examples 10-14 may optionally include that each entry of the directory cache comprises a directory vector, and that each directory vector is to indicate coherency states and owner entities of a plurality of shared memory locations.

In Example 16, the subject matter of Examples 10-15 may optionally include: determining, by the control circuit, whether a requested shared memory location is exclusively owned by an entity; and in response to a determination that the requested shared memory location is exclusively owned by the entity, issuing, by the control circuit, a back invalidate command to the entity.

In Example 17, a computing device may include one or more processors, and a memory having stored therein a plurality of instructions that when executed by the one or more processors, cause the computing device to perform the method of any of Examples 10 to 16.

In Example 18, a machine readable medium may have stored thereon data, which if used by at least one machine, causes the at least one machine to fabricate at least one integrated circuit to perform a method according to any one of Examples 10 to 16.

In Example 19, an electronic device may include means for performing the method of any of Examples 10 to 16.

In Example 20, a system for memory access may include: a plurality of host devices; at least one memory expansion device; and a switch to couple the plurality of host devices and the at least one memory expansion device via Compute Express Link (CXL) interconnects. The at least one memory expansion device may include a control circuit to: for each submission queue of a plurality of submission queues, identify an atomic memory location specified in a first entry of the submission queue, wherein each submission queue is to store access requests from a different host device of the plurality of host devices; determine whether the atomic memory location includes existing requester information; and in response to a determination that the atomic memory location does not include existing requester information, perform an atomic operation for the atomic memory location based on the first entry of the submission queue.

In Example 21, the subject matter of Example 20 may optionally include that the control circuit is further to, in response to the determination that the atomic memory location does not include existing requester information: write new requester information to the atomic memory location.

In Example 22, the subject matter of Examples 20-21 may optionally include that the control circuit includes a directory cache, and that the control circuit is to coordinate coherence across a plurality of cache coherence domains using the directory cache.

In Example 23, the subject matter of Examples 20-22 may optionally include that the control circuit is to, in response to a determination that a requested shared memory location is exclusively owned by an entity: issue a back invalidate command to the entity.

In Example 24, an apparatus for memory access may include: means for accessing a plurality of submission queues, where each submission queue is to store access requests from a different requester; for each submission queue of the plurality of submission queues, means for identifying an atomic memory location specified in a first entry of the submission queue; means for determining whether the atomic memory location includes existing requester information; and means for, in response to a determination that the atomic memory location does not include existing requester information, performing an atomic operation for the atomic memory location based on the first entry of the submission queue.

In Example 25, the subject matter of Example 24 may optionally include means for, in response to the determination that the atomic memory location does not include existing requester information, writing new requester information to the atomic memory location.

In Example 26, the subject matter of Examples 24-25 may optionally include that the new requester information is included in the first entry of the submission queue, and wherein the new requester information comprises at least a virtual hierarchy identifier, a bus identifier, a device identifier, and a function identifier.

In Example 27, the subject matter of Examples 24-26 may optionally include that the plurality of submission queues are stored in an enqueue memory region of the device.

In Example 28, the subject matter of Examples 24-27 may optionally include means for coordinating coherence across a plurality of cache coherence domains using a directory cache included in a control circuit.

In Example 29, the subject matter of Examples 24-28 may optionally include that each entry of the directory cache comprises a directory vector, and that each directory vector is to indicate coherency states and owner entities of a plurality of shared memory locations.

In Example 30, the subject matter of Examples 24-29 may optionally include: means for determining whether a requested shared memory location is exclusively owned by an entity; and means for, in response to a determination that the requested shared memory location is exclusively owned by the entity, issuing a back invalidate command to the entity.

In various embodiments described herein, an interconnect device may include circuitry or other logic to allow a processor to directly read data from a memory address with cache coherency that is managed by another processor (i.e., a "home" processor). Further, the interconnect device may handle coherence tasks associated with the direct read, including maintaining a directory, initiating back-invalidate flows, and so forth. In some embodiments, the direct data transfer may not pass through the home processor and a processor interconnect. Accordingly, the direct read may be performed in relatively fewer hops (e.g., two hops), and may thereby involve less latency and bandwidth than conventional approaches. Further, some embodiments may reduce power consumption associated with memory reads, and may reduce the cost associated with sizing the processor interconnect.

Note that, while FIGS. 1-9 illustrate various example implementations, other variations are possible. For example, the examples shown in FIGS. 1-9 are provided for the sake of illustration, and are not intended to limit any embodiments. Specifically, while embodiments may be shown in simplified form for the sake of clarity, embodiments may include any number and/or arrangement of components. For example, it is contemplated that some embodiments may include any number of components in addition to those shown, and that different arrangement of the components shown may occur in certain implementations. Furthermore, it is contemplated that specifics in the examples shown in FIGS. 1-9 may be used anywhere in one or more embodiments.

Understand that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a memory comprising at least one atomic memory region;
a control circuit coupled to the memory, the control circuit to:
for each submission queue of a plurality of submission queues, identify an atomic memory location specified in a first entry of the submission queue, wherein each submission queue is to store access requests from a different requester;
determine whether the atomic memory location includes existing requester information that matches requester information from the first entry; and
in response to a determination that the atomic memory location does not include existing requester information that matches requester information from the first entry, perform an atomic operation for the atomic memory location based at least in part on the first entry of the submission queue.

2. The apparatus of claim 1, wherein the control circuit is further to, in response to the determination that the atomic memory location does not include existing requester information:
write new requester information to the atomic memory location.

3. The apparatus of claim 2, wherein the new requester information is included in the first entry of the submission queue, and wherein the new requester information comprises at least a virtual hierarchy identifier, a bus identifier, a device identifier, and a function identifier.

4. The apparatus of claim 1, wherein the control circuit is further to, in response to a determination that the atomic memory location does include existing requester information:
move the first entry to a tail end of the submission queue.

5. The apparatus of claim 1, wherein the plurality of submission queues are stored in an enqueue memory region of the apparatus.

6. The apparatus of claim 1, wherein each submission queue of the plurality of submission queues is stored in local memory of a different host device.

7. The apparatus of claim 1, wherein the control circuit comprises a directory cache, and wherein the control circuit is to coordinate coherence across a plurality of cache coherence domains using the directory cache.

8. The apparatus of claim 7, wherein each entry of the directory cache comprises a directory vector, and wherein each directory vector is to indicate coherency states and owner entities of a plurality of shared memory locations.

9. The apparatus of claim 1, wherein the control circuit is to, in response to a determination that a requested shared memory location is exclusively owned by an entity:
issue a back invalidate command to the entity.

10. A method comprising:
accessing, by a control circuit of a device, a plurality of submission queues, wherein each submission queue is to store access requests from a different requester coupled to the device;
for each submission queue of the plurality of submission queues, identifying, by the control circuit, an atomic memory location specified in a first entry of the submission queue;

determining, by the control circuit, whether the atomic memory location includes existing requester information that matches requester information from the first entry; and in response to a determination that the atomic memory location does not include existing requester information that matches requester information from the first entry, performing, by the control circuit, an atomic operation for the atomic memory location based on the first entry of the submission queue.

11. The method of claim 10, further comprising:

in response to the determination that the atomic memory location does not include existing requester information, writing new requester information to the atomic memory location.

12. The method of claim 11, wherein the new requester information is included in the first entry of the submission queue, and wherein the new requester information comprises at least a virtual hierarchy identifier, a bus identifier, a device identifier, and a function identifier.

13. The method of claim 10, wherein the plurality of submission queues are stored in an enqueue memory region of the device.

14. The method of claim 10, further comprising:

coordinating, by the control circuit, coherence across a plurality of cache coherence domains using a directory cache included in the control circuit.

15. The method of claim 14, wherein each entry of the directory cache comprises a directory vector, and wherein each directory vector is to indicate coherency states and owner entities of a plurality of shared memory locations.

16. The method of claim 10, further comprising:

determining, by the control circuit, whether a requested shared memory location is exclusively owned by an entity; and in response to a determination that the requested shared memory location is exclusively owned by the entity, issuing, by the control circuit, a back invalidate command to the entity.

17. A system comprising:

a plurality of host devices;

at least one memory expansion device;

a switch to couple the plurality of host devices and the at least one memory expansion device via Compute Express Link (CXL) interconnects, wherein the at least one memory expansion device comprises a control circuit to:

for each submission queue of a plurality of submission queues, identify an atomic memory location specified in a first entry of the submission queue, wherein each submission queue is to store access requests from a different host device of the plurality of host devices;

determine whether the atomic memory location includes existing requester information that matches requester information from the first entry; and in response to a determination that the atomic memory location does not include existing requester information that matches requester information from the first entry, perform an atomic operation for the atomic memory location based on the first entry of the submission queue.

18. The system of claim 17, wherein the control circuit is further to, in response to the determination that the atomic memory location does not include existing requester information:

write new requester information to the atomic memory location.

19. The system of claim 17, wherein the control circuit comprises a directory cache, and wherein the control circuit is to coordinate coherence across a plurality of cache coherence domains using the directory cache.

20. The system of claim 17, wherein the control circuit is to, in response to a determination that a requested shared memory location is exclusively owned by an entity:

issue a back invalidate command to the entity.

* * * * *